(12) United States Patent
Kugumiya et al.

(10) Patent No.: US 7,738,499 B2
(45) Date of Patent: Jun. 15, 2010

(54) AUDIO/VIDEO SYNCHRONIZING SYSTEM AND MONITOR APPARATUS

(75) Inventors: Mamoru Kugumiya, Chiba (JP); Koji Nagata, Tokyo (JP); Akira Sakamoto, Kanagawa (JP); Takao Takahashi, Tokyo (JP)

(73) Assignee: Sony Corporation (JP)

( * ) Notice: Subject to any disclaimer, the term of this patent is extended or adjusted under 35 U.S.C. 154(b) by 897 days.

(21) Appl. No.: 11/233,557

(22) Filed: Sep. 23, 2005

(65) Prior Publication Data

US 2006/0072627 A1    Apr. 6, 2006

(30) Foreign Application Priority Data

Oct. 4, 2004    (JP)    ............................ P2004-291532

(51) Int. Cl.
*H04J 3/06*    (2006.01)
*H04J 3/00*    (2006.01)
*G06F 15/173*    (2006.01)

(52) U.S. Cl. ....................... 370/503; 370/498; 370/464; 370/345; 709/224; 709/227; 725/110

(58) Field of Classification Search ................. 370/503, 370/498, 464, 345, 350, 487, 535, 395.64, 370/253; 725/110, 109; 386/46; 709/224, 709/227

See application file for complete search history.

(56) References Cited

U.S. PATENT DOCUMENTS 6,205,144 B1 *    3/2001    Mohrmann ............ 370/395.64

(Continued)

FOREIGN PATENT DOCUMENTS

EP    1 259 082 A2    11/2002

(Continued)

OTHER PUBLICATIONS

Kunzman, Adam J. and Wetzel, Alan T., "1394 High Performance Serial Bus: The Digital Interface for ATV", IEEE Transactions on Consumer Electronics, New York, vol. 41, No. 3, Aug. 1995, pp. 893-900.

*Primary Examiner*—Frank Duong
*Assistant Examiner*—Jamal Javaid
(74) *Attorney, Agent, or Firm*—Lerner, David, Littenberg, Krumholz & Mentlik, LLP

(57) ABSTRACT

An audio/video synchronizing system and a monitor apparatus can provide a set of contents where the images and the sounds of the contents show lip synchronization to the user so that the user may not have any strange and uneasy feeling if only the images are transmitted wirelessly. A contents server outputs sounds of a set of contents at a timing delayed by an initial delay time (1 second) that is greater than the transmission delay time according to the PTS and the DTS defined by the contents server by taking the largest transmission delay into consideration. The monitor corrects the time base of the STC added to the video packets according to the transmission delay time and subsequently outputs the images according to the SCR, the time base of which is corrected, and the PTS and the DTS, for which the initial delay time is defined. With this arrangement, it is possible to compensate the delay of the transmission delay time and display the images at a timing synchronized with the timing of outputting the sounds. Thus, it is possible to realize lip synchronization between the sounds and the images if only the images are transmitted wirelessly.

6 Claims, 11 Drawing Sheets

U.S. PATENT DOCUMENTS

| | | |
|---|---|---|
| 7,069,325 B1 * | 6/2006 | Lu et al. ..................... 709/226 |
| 7,185,090 B2 * | 2/2007 | Kowalski et al. ............ 709/224 |
| 2001/0008535 A1 | 7/2001 | Lanigan |
| 2002/0131398 A1 | 9/2002 | Taylor |
| 2006/0002681 A1 * | 1/2006 | Spilo et al. .................... 386/46 |

FOREIGN PATENT DOCUMENTS

JP    2004-201022 A    7/2004

* cited by examiner

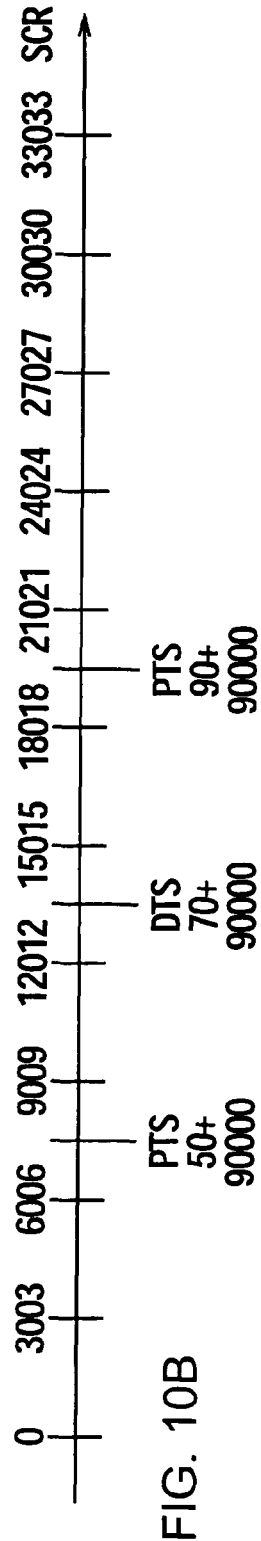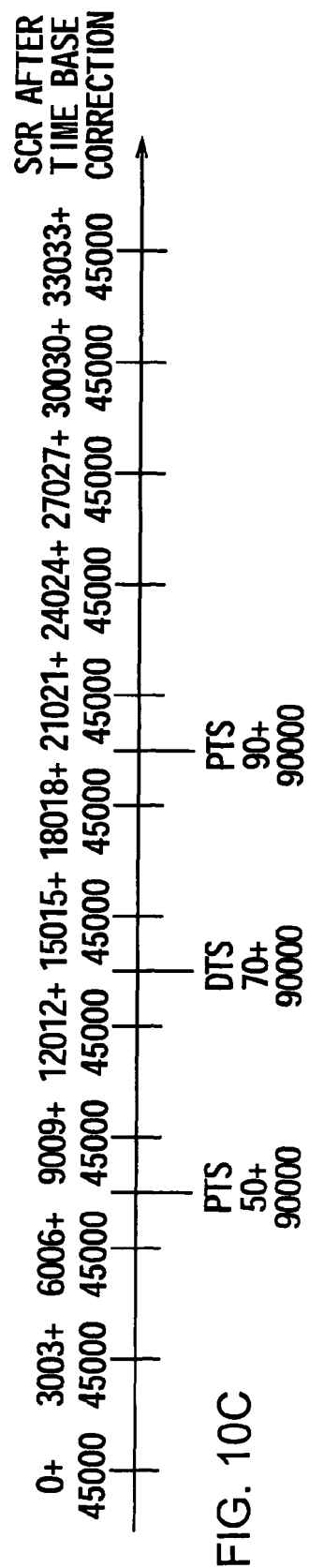

AUDIO/VIDEO SYNCHRONIZING SYSTEM AND MONITOR APPARATUS

CROSS-REFERENCE TO RELATED APPLICATIONS

The present application claims priority from Japanese Patent Application No. JP 2004-291532 filed on Oct. 4, 2004, the disclosure of which is hereby incorporated by reference herein.

BACKGROUND OF THE INVENTION

The present invention relates to an audio/video synchronizing system and a monitor apparatus that can suitably be applied to an intra-car entertainment system.

FIG. 1 of a known intra-car entertainment system 1 adapted to select a set of contents of a program, or an audio and/or video work, coming from a TV broadcasting station or a radio broadcasting station or stored in a DVD (digital versatile disk) or a hard disk 2 by means of a selector 3 according to a controller operation made by a user and transmits the contents data of the selected set of contents to a decoder 4.

The decoder 4 restores the images and the sounds of the contents by decoding the transmitted contents data and causes a display 5 to display the restored images and a speaker 6 to output the restored sounds. Thus, the images and the sounds are output in a synchronized state.

Meanwhile, Japanese Patent Appln. Laid-Open Publication No. 2004-201022 discloses a technique for outputting images and sounds in a synchronized state. More specifically, the sounds of a moving picture are wirelessly transmitted to a remotely located speaker or the like and output in synchronism with the images being displayed on a display apparatus.

On the other hand, so-called mini-vans and other wagon type automobiles that have become popular in recent years are mostly equipped with a wireless rear monitor for providing contents to the passenger(s) sitting on the rear seat for the purpose of entertainment. Then, the images of a set of contents can be wirelessly transmitted from a contents server arranged near the front seats to the wireless rear monitor arranged near the rear seat and displayed there.

Concretely, as shown in FIG. 2, an intra-car entertainment system 10 using a wireless rear monitor includes a wireless rear monitor 12 and is adapted to transmit wirelessly only the video data of a set of contents from a contents server 11 arranged near the front seats to the wireless rear monitor 12 arranged near the rear seat.

Thus, the wireless rear monitor 12 decodes the video data of a set of contents received from the contents server 11 at the side of the front seat and displays the set of contents. The wireless rear monitor 12 can also electrically charge the internal battery it has by means of a charging station 14 that is connected to a power source 13 and also arranged near the rear seat. The wireless rear monitor 12 may be arranged on the charging station 14. It may be needless to say that the wireless rear monitor 12 can display the images of a set of contents while it is arranged on the charging station 14.

FIG. 3 is a schematic block diagram of the intra-car entertainment system 10, in which the components same as those of FIG. 1 are denoted respectively by the same reference symbols. Referring to FIG. 3, contents server 11 of the intra-car entertainment system 10 selects a set of contents from sets of contents including those that are compressed and encoded by an encoder 21 and those that are read out from a hard disk 2 by means of a selector 3 that operates according to the operation of a controller and transmits the selected set of contents to a distributor 22.

The distributor 22 separates the video data and the audio data of the contents data of the set of contents and transmits only the audio data to an audio decoder 23, which decodes the audio data so that the decoded audio data are output from a front speaker 6 as the sounds of the set of contents. On the other hand, the distributor 22 packetizes the video data and wirelessly transmits the packetized video data to a wireless transmitter/receiver 25 of the wireless rear monitor 12 by way of a wireless transmitter/receiver 24.

In the wireless rear monitor 12, the video data received by means of the wireless transmitter/receiver 25 are sent out to a video decoder 26, which video decoder 26 decodes the contents and displays the images of the contents on the display 27.

Referring to FIG. 4, the wireless transmitter/receiver 24 of the contents server 11 is adapted to transmit video data as PS (program stream) packets when it transmits video data to the wireless rear monitor 12. A PS packet is composed of a PS header and a PES (packetized elementary stream) packet.

A start code, SCR bases and an SCR extension are described in the PS header. The SCR bases represent the upper order digit values of an SCR (system clock reference) expressed by upper order 33 bits with a degree of precision of 90 [khz], whereas SCR extension represents the lower order digit values expressed by lower order 9 bits with a degree of precision of 27 [MHz].

Note that an SCR is a time stamp for transmitting clock time information of the transmitting side, or the contents server 11, to the wireless rear monitor 12. The system time clock (to be referred to as STC hereinafter) of the contents server 11 and the STC of the wireless rear monitor 12 are synchronized with each other by means of the SCR.

Referring now to FIG. 5, a PES packet is composed of a PES header and video data of an access unit as defined in the International Organization for Standardization (ISO)/IEC13813-1. A start code, a stream ID, a packet length . . . , a PTS (presentation time stamp) and a DTS (decoding time stamp), . . . are described in the PES header.

A PTS is a clock counter value as observed at a 90 [khz] clock that indicates the output clock time of the access unit of the video data. A DTS is a clock counter value as observed at a similar 90 [khz] clock that indicates the decoding time clock, showing the timing of decoding.

Thus, the video decoder 26 of the wireless rear monitor 12 is adapted to reproduce the STC according to the SCR of the PS packet received from the contents server 11, decode the video data at the time when the clock time of the STC becomes equal to the value of the PTS and that of the DTS value and output the decoded data to the display 27.

In an intra-car entertainment system 10 having the above-described configuration, transmission delays can occur due to various factors such as retransmission control that is required when a transmission error arises because video data that are packetized to PS packets are wirelessly transmitted from the contents server 11 to the wireless rear monitor 12.

More specifically, as shown in FIGS. 6A and 6B, the video decoder 26 of the wireless rear monitor 12 is adapted to decode the video data according to the SCR and the PTS and the DTS of the PES packet contained in the PS packet of a frame (29.97 [Hz]) it receives from the contents server 11 on the basis of a 1 access unit and output the decoded video data to the display 27.

Note that the PTS and the DTS are the values of the readings of clock counters as observed by means of [90 khz]

clocks respectively and the SCR is the value of the reading of a clock counter as observed by means of a [27 MHz] clock. The value of the reading of the clock counter of the SCR is expressed by that of a clock counter of frequency division of 1/300. Thus, the video data of a frame is transmitted at every reading of "3003" of the clock counter.

The wireless rear monitor 12 decodes video data and outputs them to the display 27 according to the SCR, the PTS and the DTS it receives from the contents server 11. If, for instance, a transmission delay of 0.5 seconds occurs between the contents server 11 and the wireless rear monitor 12 due to a control operation for retransmitting video data due to a transmission error at the time of the wireless transmission, there arises a time lag of 0.5 seconds in the clock time information of the SCR between the contents server 11 and the wireless rear monitor 12 so that the sounds output from the front speaker 6 by the contents server 11 and the images displayed on the display 27 of the wireless rear monitor 12 would no longer show lip synchronization.

Thus, even when the images that are displayed on the display 27 of the wireless rear monitor 12 show a delay of 0.5 seconds relative to the sounds output from the front speaker 6 by the contents server 11 in an intra-car entertainment system 10, the user watching and listening the set of contents may feel strange and uneasy.

In view of the above identified circumstances, it is therefore an object of the present invention to provide an audio/video synchronizing system and a monitor apparatus that can provide a set of contents where the images and the sounds of the contents show lip synchronization so that the user may not have any strange and uneasy feeling if only the images are transmitted wirelessly.

SUMMARY OF THE INVENTION

In an aspect of the present invention, the above object is achieved by providing an audio/video synchronizing system for synchronizing sounds of a set of contents output from a speaker connected to a contents server and images of the set of contents output from a monitor when only the images are wirelessly output from the contents server. The system includes a contents server and a monitor. The contents server of the system includes a reference clock time wired transmission means for transmitting the reference clock time of the contents server to the monitor by wire; an image transmission means for setting up a time stamp with an attached clock counter value corresponding to an initial delay time for delaying the output timing of the audio packets and the video packets of the set of contents, considering the largest transmission delay of wireless transmission, and wirelessly transmitting the video packets to the monitor with the time stamp showing the attached initial delay; and a sound outputting means for reproducing the sound packets according to the reference clock time of the contents server and the time stamp showing the attached initial delay and outputting the sounds of the set of contents. The monitor of the system includes an image receiving means for receiving the wirelessly transmitted video packets; a reference clock time synchronizing means for receiving the reference clock time transmitted from the contents server by wire and synchronizing the reference clock time of the contents server and the reference clock time of the monitor; a transmission delay time computing means for computing the transmission delay time due to the wireless transmission according to the reference clock time of the monitor and the reference clock time information of the contents server attached to the video packets; a delay correcting means for compensating the transmission delay time by correcting the reference clock time information attached to the video packets according to the transmission delay time; and an image outputting means for synchronizing the output timing of the images and that of the sounds by decoding the video packets according to the corrected reference clock time information and the time stamp with the added clock counter value corresponding to the initial delay time.

Thus, the contents server outputs the sounds of the set of contents at the timing showing a delay of a predetermined time period greater than the transmission delay time according to the time stamp obtained by adding the clock counter value corresponding to the initial delay time, considering a maximum transmission delay and then the monitor outputs the images according to the time stamp obtained by correcting the reference clock time information attached to the video packets received from the contents server according to the transmission delay time and subsequently adding the corrected reference clock time information and the clock counter value that corresponds to the initial delay time. With this arrangement, it is possible to compensate the transmission delay and display the images at the image output timing that is synchronized with the sound output timing. Hence it is possible to provide the user with a set of contents in such a way that the sounds and the images of the contents show lip synchronization even when only images are transmitted wirelessly without making the user feel strange and uneasy.

In another aspect of the present invention, there is provided a monitor adapted to output sounds of a set of contents from a speaker connected to a contents server providing the set of contents but receive images of the set of contents transmitted from the contents server wirelessly and output them on a display means, the monitor including: a reference clock time synchronizing means for receiving the reference clock time of the contents server transmitted from the contents server by wire and synchronizing the reference clock time of the contents server and the reference clock time of the monitor; an image receiving means for receiving the video packets transmitted from the contents server with a time stamp attached thereto and obtained by adding the clock counter value corresponding to the initial delay time in advance in order to delay the output timing of the sounds and the images, considering a possible maximum transmission delay due to wireless transmission in advance; a transmission delay time computing means for computing the transmission delay time due to the wireless transmission according to the reference clock time of the monitor and the reference clock time information of the contents server attached to the video packets; a delay correcting means for compensating the transmission delay time by correcting the reference clock time information attached to the video packets according to the transmission delay time; and an image outputting means for synchronizing the output timing of the images and that of the sounds by outputting the images according to the corrected reference clock time information and the time stamp with the added clock counter value corresponding to the initial delay time.

Thus, the monitor can receive the video packets transmitted from the contents server with a time stamp attached thereto and obtained by adding the clock counter value corresponding to the initial delay time in advance in order to delay the output timing of the sounds and the images, considering a possible maximum transmission delay due to wireless transmission in advance, compensate the transmission delay time by correcting the reference clock time information attached to the video packets according to the transmission delay time and synchronize the output timing of the images and that of the sounds by outputting the images according to the corrected reference clock time information and the time stamp with the added clock counter value corresponding to the initial delay time. Hence it is possible to provide the user with a set of contents in such a way that the sounds and the images of the contents show lip synchronization even when only images are transmitted wirelessly without making the user feel strange and uneasy in a state where a transmission delay exists.

In still another aspect of the present invention, there is provided an audio/video synchronizing method of synchronizing the output timing of sounds and the output timing of images of a set of contents, the sounds being output from a speaker connected to a contents server, the images being received and displayed by a display means connected wirelessly to the contents server, the method including: receiving a reference clock time of the contents server transmitted from the contents server by wire and synchronizing the reference clock time of the contents server and the reference clock time of the monitor; receiving video packets transmitted from the contents server with a time stamp attached thereto and obtained by adding a clock counter value corresponding to an initial delay time in advance in order to delay the output timing of the sounds and the images, considering a possible maximum transmission delay due to wireless transmission in advance; computing a transmission delay time due to the wireless transmission according to the reference clock time of the monitor and the reference clock time information of the contents server attached to the video packets; compensating the transmission delay time by correcting the reference clock time information attached to the video packets according to the transmission delay time; and synchronizing the output timing of the images and the output timing of the sounds by outputting the images according to the corrected reference clock time information and the time stamp with the added clock counter value corresponding to the initial delay time.

Thus, with the above defined method, it is possible to receive the video packets transmitted from the contents server with a time stamp attached thereto and obtained by adding the clock counter value corresponding to the initial delay time in advance in order to delay the output timing of the sounds and the images, considering a possible maximum transmission delay due to wireless transmission in advance, compensate the transmission delay time by correcting the reference clock time information attached to the video packets according to the transmission delay time and synchronize the output timing of the images and that of the sounds by outputting the images according to the corrected reference clock time information and the time stamp with the added clock counter value corresponding to the initial delay time. Hence it is possible to provide the user with a set of contents in such a way that the sounds and the images of the contents show lip synchronization even when only images are transmitted wirelessly without making the user feel strange and uneasy in a state where a transmission delay exists.

As pointed out above, in an audio/video synchronizing system according to the invention, the contents server outputs the sounds of the set of contents at the timing showing a delay of a predetermined time period greater than the transmission delay time according to the time stamp obtained by adding the clock counter value corresponding to the initial delay time, considering a maximum transmission delay and then the monitor outputs the images according to the time stamp obtained by correcting the reference clock time information attached to the video packets received from the contents server according to the transmission delay time and subsequently adding the corrected reference clock time information and the clock counter value that corresponds to the initial delay time. With this arrangement, it is possible to compensate the transmission delay and display the images at the image output timing that is synchronized with the sound output timing. Hence it is possible to provide the user with a set of contents in such a way that the sounds and the images of the contents show lip synchronization even when only images are transmitted wirelessly without making the user feel strange and uneasy.

Also as pointed out above, with an audio/video synchronizing apparatus and an audio/video synchronizing method according to the invention, it is possible to receive the video packets transmitted from the contents server with a time stamp attached thereto and obtained by adding the clock counter value corresponding to the initial delay time in advance in order to delay the output timing of the sounds and the images, considering a possible maximum transmission delay due to wireless transmission in advance, compensate the transmission delay time by correcting the reference clock time information attached to the video packets according to the transmission delay time and synchronize the output timing of the images and that of the sounds by outputting the images according to the corrected reference clock time information and the time stamp with the added clock counter value corresponding to the initial delay time. Hence it is possible to provide the user with a set of contents in such a way that the sounds and the images of the contents show lip synchronization even when only images are transmitted wirelessly without making the user feel strange and uneasy in a state where a transmission delay exists.

The nature, principle and utility of the invention will become more apparent from the following detailed description when read in conjunction with the accompanying drawings in which like parts are designated by like reference numerals or characters.

BRIEF DESCRIPTION OF THE DRAWINGS

FIGS. 10A to 10C are schematic illustrations of the lip synchronization adjustment method of the first embodiment;

DETAILED DESCRIPTION

Now, preferred embodiments of the present invention will be described in greater detail by referring to the accompanying drawings.

(1) First Embodiment

(1-1) Overall Configuration of Intra-Car Entertainment System

Figure 1:
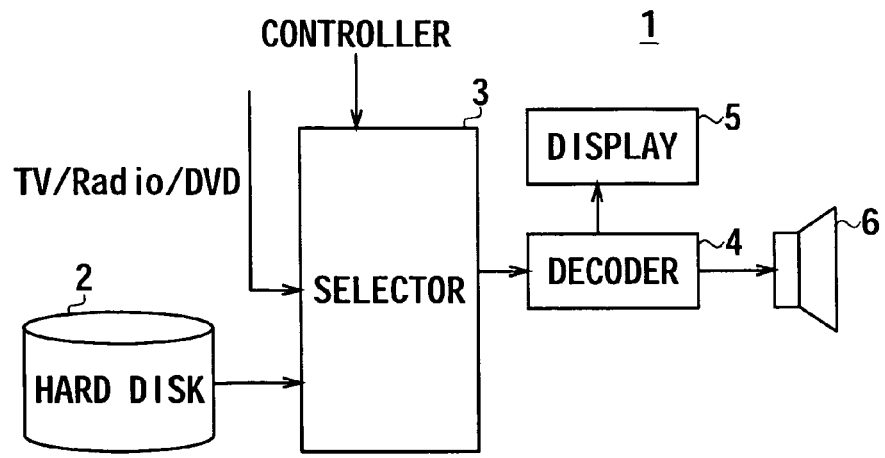
FIG. 1 is a schematic block diagram of a known intra-car entertainment system (1), illustrating the circuit configuration thereof.
Figure 2:
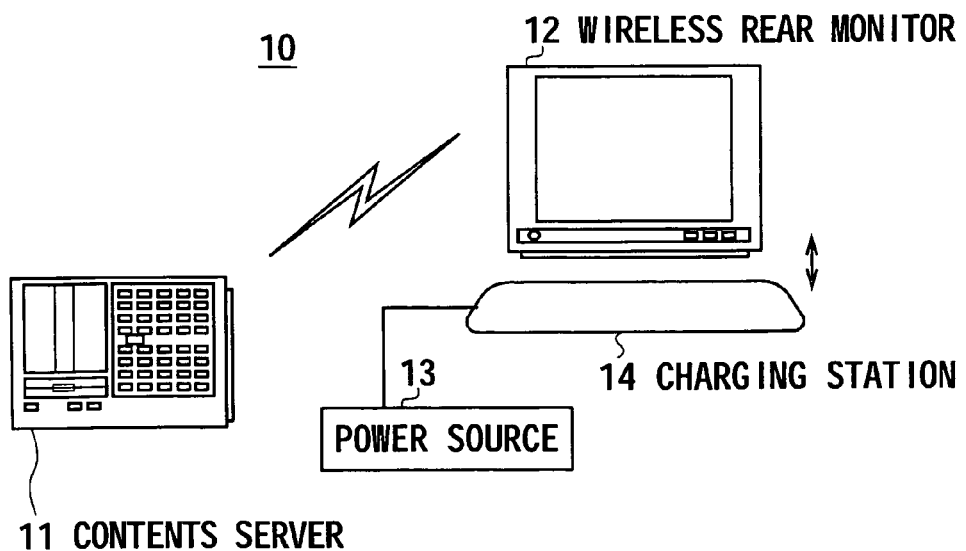
FIG. 2 is a schematic illustration of another known intra-car entertainment system (2), including a wireless rear monitor, showing the configuration thereof.
Figure 3:
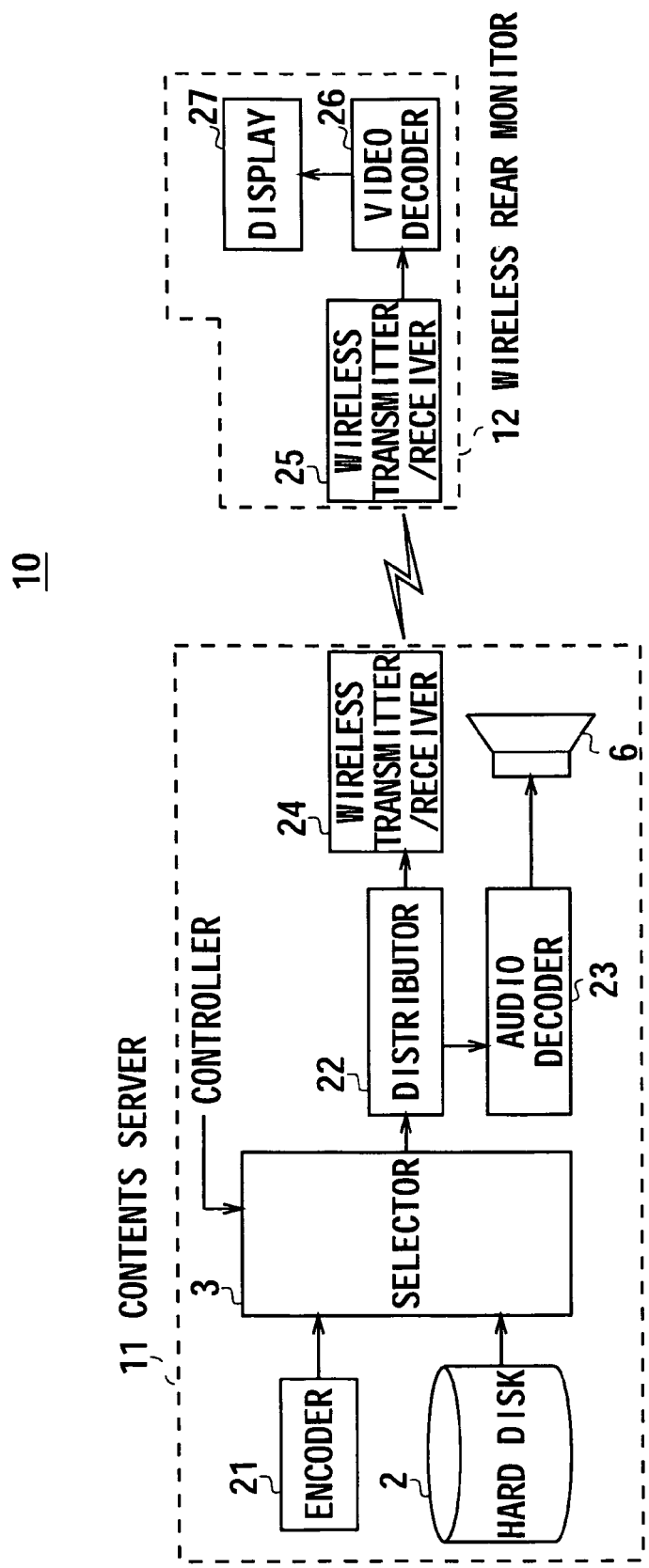
FIG. 3 is a schematic block diagram of the known intra-car entertainment system (2), including a wireless rear monitor, illustrating the circuit configuration thereof.
Figure 7:
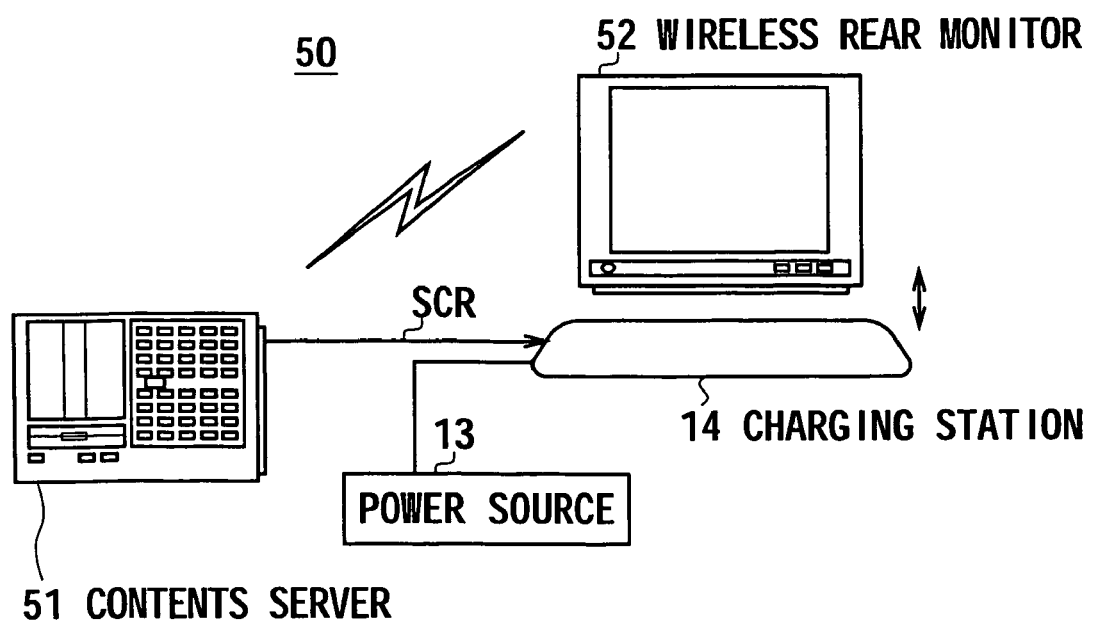
FIG. 7 is a schematic illustration of the first embodiment of intra-car entertainment system according to the invention, showing the overall configuration thereof.

In FIG. 7, the components that are same as or similar to those of FIG. 2 are denoted respectively by the same reference symbols. Referring FIG. 7, the intra-car entertainment system of the first embodiment is generally denoted by reference symbol 50, which comprises a contents server 51 and a wireless rear monitor 52 that are connected with each other wirelessly.

Thus, the intra-car entertainment system 50 is so designed that the audio data of a set of contents are decoded by the contents server 51 and output from a front speaker (not shown), while the video data of the set of contents that the wireless rear monitor 52 receives from the contents server 51 are decoded by and output from the wireless rear monitor 52. Therefore, the images of the set of contents are provided to the passenger(s) sitting on the rear seat by way of the wireless rear monitor 52, while the sounds of the set of contents are output from the front speaker at the side of the front seat so as to be listened to by the passenger(s).

In the intra-car entertainment system 50, the contents server 51 and a charging station 14 are connected to each other by wire so that the SCR of the contents server 51 is transmitted by wire to the wireless rear monitor 52 by way of the charging station 14.

With this arrangement, the wireless rear monitor 52 can synchronize the SCR transmitted from the contents server 51 by wire and the SCR that the wireless rear monitor 52 generates in a state where it is arranged on the charging station 14.

Additionally, in the intra-car entertainment system 50, the internal battery of the wireless rear monitor 52 can be charged with electricity as power is supplied from a power source 13 in a state where the wireless rear monitor 52 is arranged on the charging station 14 and the images of a set of contents can be displayed on the wireless rear monitor 52 in the state where the wireless rear monitor 52 is arranged on the charging station 14.

(1-2) Circuit Configuration of Intra-Car Entertainment System

Figure 8:
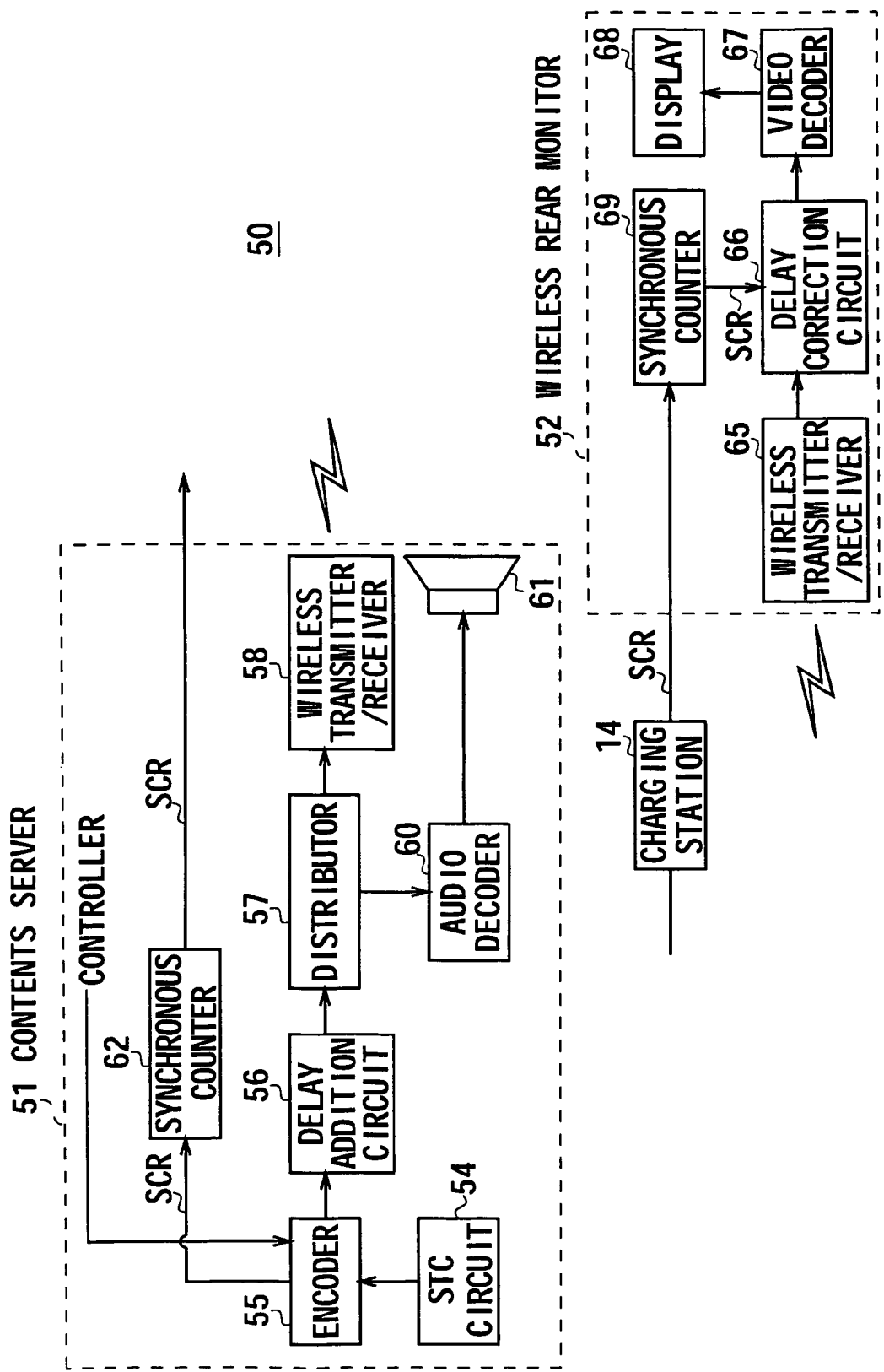
FIG. 8 is a schematic block diagram of the first embodiment of intra-car entertainment system according to the invention, showing the circuit configuration thereof.

Referring to FIG. 8, encoder 55 of the contents server 51 performs a compression coding operation on a set of contents according to the STC supplied from an STC circuit 54, using a predetermined compression coding system (e.g., the MPEG (Moving Picture Experts Group) 2 system) and transmits the data obtained as a result of the compression coding to a delay addition circuit 56 and also the SCR that is used for the compression coding of the contents to a synchronous counter 62.

The synchronous counter 62 holds the SCR supplied to it from the STC circuit 54 by way of the encoder 55 and transmits it to the charging station 14 by wire.

Figure 4:
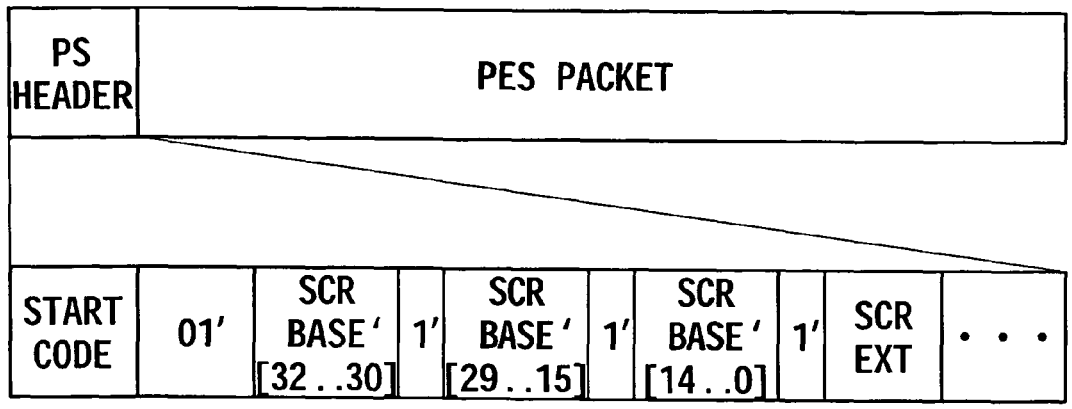
FIG. 4 is a schematic illustration of the data structure of a PS packet.
Figure 5:
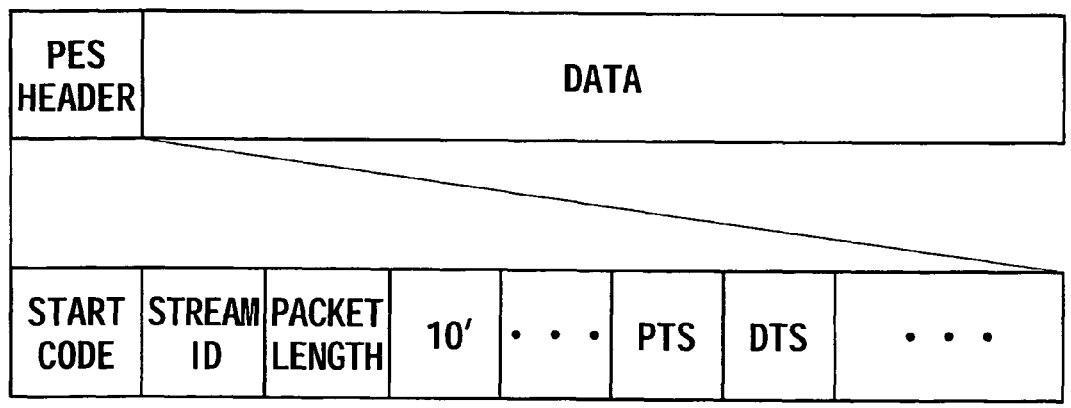
FIG. 5 is a schematic illustration of the data structure of a PES packet.
Figure 6A:
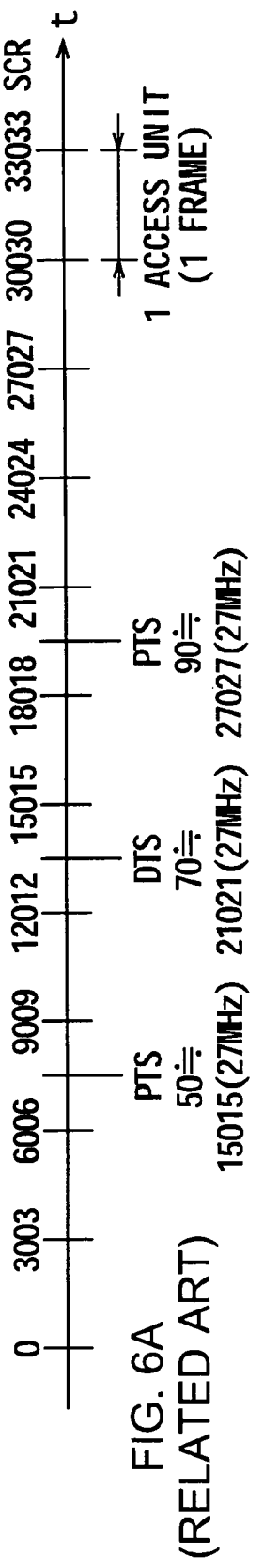
FIGS. 6A and 6B are schematic illustrations of the discrepancy of the output timings of sounds and images due to a transmission delay of a known intra-car entertainment system.
Figure 6B:
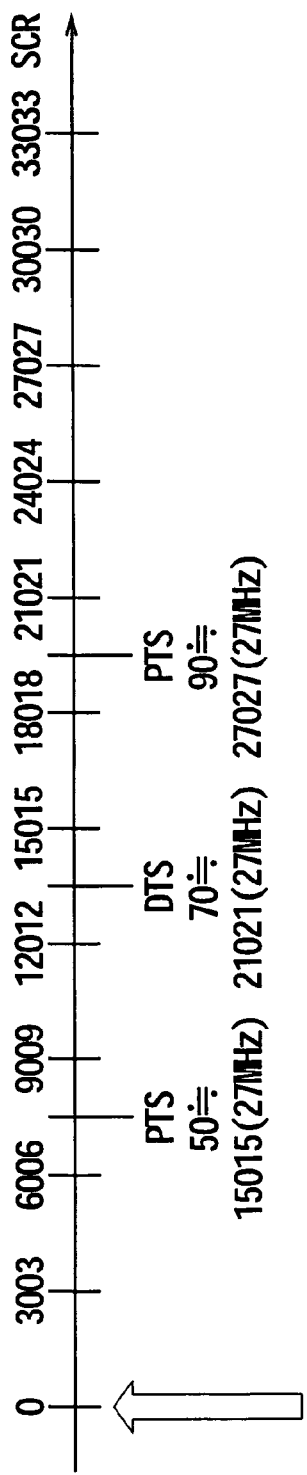

The delay addition circuit 56 is so adapted that, when the contents data that have been compression-coded are packetized according to the data structure as shown in FIGS. 4 and 5, it adds a clock counter value of "90000" that corresponds to a second (90 [khz]), which is the initial delay time predetermined by taking the transmission delay of the wireless transmission (for example, 0.5 seconds or 0.7 seconds) into consideration in advance, to the PTS and the DTS as observed at a 90 [khz] clock to delay the access unit output clock time and the decoding clock time from the proper timings by an initial delay time and transmits the PS packets obtained as a result of the addition to the distributor 57.

The distributor 57 transmits the PS packets of the video data out of the PS packets of the set of contents data supplied from the delay addition circuit 56 to a wireless transmitter/receiver 58 and also the PS packets of the audio data out of the PS packets of the set of contents data to audio decoder 60. The wireless transmitter/receiver 58 transmits the PS packets of the video data to the wireless rear monitor 52 according to a wireless LAN (local area network) protocol such as the IEEE (Institute of Electrical and Electrics Engineers) 802.11g.

The audio decoder 60 reproduces the PS packets of the audio data and outputs them as the sounds of the set of contents from the front speaker 61 at the time when the value of the SCR added to the PS packets of the audio data comes to be equal to the PTS value to which the clock counter value of "90000" that corresponds to a second, or the initial delay time, is added.

Thus, the contents server 51 outputs the sounds of the set of contents from the front speaker 61 at the time delayed by a second from the clock time specified by the proper PTS.

On the other hand, the wireless rear monitor 52 is adapted to take in the SCR that is sequentially transmitted from the contents server 51 by wire by way of the charging station 14 and lock it with the PLL (phase locked loop) in a state where it is arranged on the charging station 14 so that it transmits the SCR of the wireless rear monitor 52, which is completely synchronized with the SCR of the contents server 51, to the delay correction circuit 66.

The wireless rear monitor 52 also receives the PS packets of the video data transmitted from the contents server 51 wirelessly by means of a wireless transmitter/receiver 65 and transmits them to the delay correction circuit 66.

The delay correction circuit 66 computes the transmission delay time of the PS packets according to the SCR value of the wireless rear monitor 52 that is completely synchronized with the SCR of the contents server 51 that is supplied with the synchronous counter 69 and the SCR value added to the PS packets transmitted wirelessly from the contents server 51 and executes a predetermined correction process (which will be described in greater detail hereinafter) that corresponds to the computed transmission delay time on the SCR added to the PS packets.

Then, the delay correction circuit 66 executes a decoding process by means of a video decoder 67 according to the corrected SCR that is obtained as a result of the correction process and displays the images of the set of contents on a display 68. In this way, it synchronizes the sounds output from the front speaker 61 of the contents server 51 and the images displayed on the display 68 to realize lip synchronization.

(1-3) Principle of Adjustment of Lip Synchronization

Figure 9A:
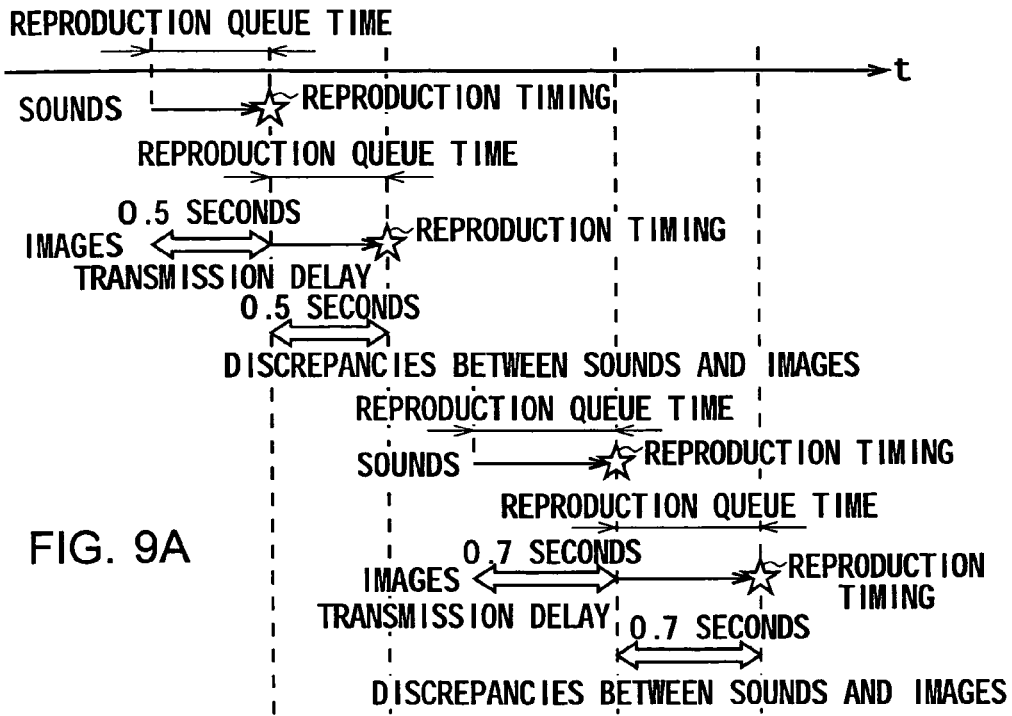
FIGS. 9A and 9B are schematic illustrations of the principle of lip synchronization adjustment.

In an intra-car entertainment system 50 typically as illustrated in FIG. 9A, the reproduction timing (as indicated by ☆) of the audio data by the contents server 51 and the reciprocation timing (as indicated by ☆) of the video data of the PS packets that are received by the wireless rear monitor 52 for the first time by way of the wireless transmission path may show a transmission delay time of 0.5 seconds, for example. Then, if the wireless rear monitor 52 outputs the images of the video data according to the PTS and the DTS, the images will be displayed with a delay of 0.5 seconds relative to the sounds (time discrepancies between the sounds and the images).

Additionally, in the intra-car entertainment system 50, the reproduction timing (as indicated by ☆) of the sounds by the contents server 51 and the reproduction timing (as indicated by ☆) of the images of the video data of the PS packets received by the wireless rear monitor 52 next time may show a transmission delay time of 0.7 seconds, for example. Then, if the wireless rear monitor 52 outputs the images of the video data according to the PTS and the DTS, the images will be displayed with a delay of 0.7 seconds relative to the sounds (time discrepancies between the sounds and the images).

Such a delay of the sounds relative to the images will make the user watching and listening to the set of contents feel strange, uneasy and very unpleasant.

Figure 9B:
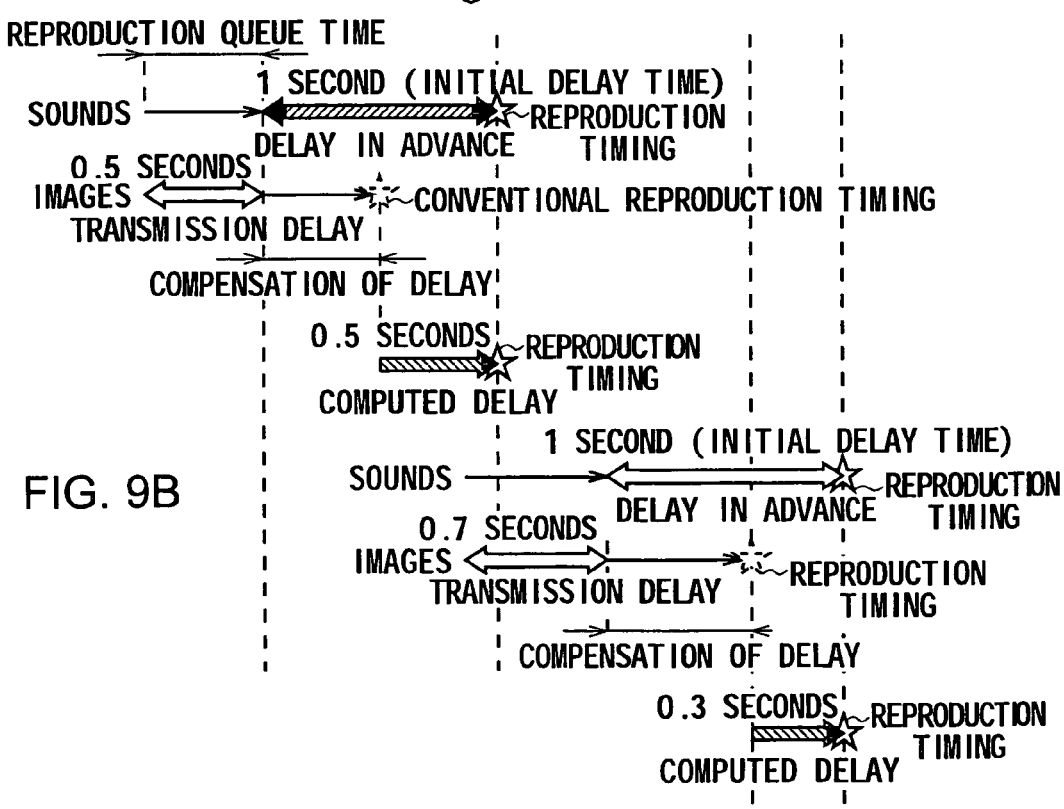

Therefore, an intra-car entertainment system 50 as illustrated in FIG. 9B is adapted to compensate the delay, or the transmission delay time (0.5 seconds or 0.7 seconds), by selecting an initial delay time (e.g., 1 second) that is greater than the transmission delay time (0.5 seconds or 0.7 seconds) for the PTS and the DTS to delay the reproduction timing in advance and adding the clock counter value that corresponds to the transmission delay time (0.5 seconds or 0.7 seconds) to the SCR value of the PS packets arriving at the wireless rear monitor 52 by wireless transmission.

With this arrangement, the wireless rear monitor 52 waits for the computed delay time (0.5 seconds or 0.3 seconds) that shows the difference between the initial delay time (1 second) and the transmission delay time (0.5 seconds or 0.7 seconds) from the time when it receives the PS packets of the video data from the contents server 51 before it displays the images of the video data.

In other words, the wireless rear monitor 52 can cause the display 68 to display the images after a total of 1 second, which is obtained by adding the transmission delay time (0.5 seconds or 0.7 seconds) and the computed delay time (0.5 seconds or 0.3 seconds), relative to the reproduction timing of the PTS and the DTS for which no initial delay time is defined.

Since the contents server 51 outputs the sounds of the set of contents from the front speaker 61 at the reproduction timing that is delayed by 1 second, or the initial delay time, the intra-car entertainment system 50 can synchronize the output timing of the sounds and that of the images after 1 second to secure lip synchronization.

(1-4) Lip Synchronization Adjusting Method

Now, the lip synchronization adjusting method that is actually used in the intra-car entertainment system 50 will be described below.

Referring to FIGS. 10A and 10B, the contents server 51 redefines the PTS and the DTS by adding the clock counter value of "90000" which corresponds to the initial delay time (e.g., 1 second), taking the transmission delay time (0.5 seconds or 0.7 seconds) into consideration in advance, to the values ("50", "70", "90", . . . ,) of the PTS and the DTS, for which no initial delay time is defined.

Thus, the contents server 51 outputs the sounds of the set of contents from the front speaker 61 at the reproduction timing that comes 1 second, which is equal to the initial delay time, after the reproduction timing of the PTS and the DTS, for which no initial delay time is defined, for the PS packets of the audio data.

On the other hand, since the PS packets of the video data are transmitted from the contents server 51 to the wireless rear monitor 52 with a transmission delay of 0.5 seconds or 0.7 seconds as shown in FIG. 10C, the images of the video data are displayed with a delay of 1.5 seconds or 1.7 seconds if the wireless rear monitor 52 outputs the images of the video data according to the PTS and the DTS (FIG. 10B), for which the initial delay time (1 second) is defined, because the PS packets of the video data arrives from the contents server 51 with a transmission delay of 0.5 seconds or 0.7 seconds.

To correct the delay, the wireless rear monitor 52 corrects the time base of the SCR by adding the clock counter value that corresponds to the transmission delay time (0.5 seconds or 0.7 seconds) to the SCR value added to the PS packets of the video data in order to compensate the time equal to the transmission delay that is observed when the PS packets of the video data arrives behind time.

If the transmission delay time is 0.5 seconds, it corresponds to a clock counter value of "45000" so that the wireless rear monitor 52 corrects the time base of the SCR by adding the clock counter value of "45000" to the SCR value and then decodes and outputs the video data according to the SCR, the time base of which is corrected, and the PTS and the DTS, for which the initial delay time is defined.

Note that, if the transmission delay time is 0.7 seconds, the wireless rear monitor 52 corrects the time base of the SCR by adding the clock counter value of "63000" to the SCR value and then decodes and outputs the video data according to the SCR, the time base of which is corrected, and the PTS and the DTS, for which the initial delay time is defined.

As a result of the arrangement that the wireless rear monitor 52 corrects the time base of the SCR, it is possible to reduce the decoding queue time at the video decoder 67 and decode the video data after waiting for the computed delay time (0.5 seconds or 0.3 seconds) obtained by subtracting the transmission delay time (0.5 seconds or 0.7 seconds, whichever appropriate) from the initial delay time (1 second) in order to display the image on the display 68.

In other words, since the sum of the transmission delay time and the computed delay time is equal to the initial delay time, which is equal to 1 second, the wireless rear monitor 52 outputs the images 1 second after the ordinary output timing.

(1-5) Operation and Effects

With the above-described arrangement, the contents server 51 of the intra-car entertainment system 50 delays the reproduction timing e.g., by 1 second, taking the transmission delay time due to the wireless transmission from the contents server 51 to the wireless rear monitor 52 and adding the clock counter value, which corresponds to the initial delay time (1 second) and is greater than the transmission delay time (0.5 seconds or 0.7 seconds), to the PTS and the DTS.

Then, the wireless rear monitor 52 of the intra-car entertainment system 50 adds the clock counter value, which corresponds to the transmission delay time, to the SCR value of the PS packets that arrive from the contents server 51 in order to correct the time base of the SCR so as to make it advance and compensate the transmission delay time (0.5 seconds or 0.7 seconds) of the video data.

As a result, the wireless rear monitor 52 decodes the PS packets of the video data according to SCR, the time base of which is corrected, and the PTS and the DTS, the reproduction timing of which is delayed by the initial delay time, and displays the images of the video data on the display 68 so that the images are displayed with a delay of 1 second, which is equal to the initial delay time.

Thus, in the intra-car entertainment system 50, the sounds are output from the front speaker 61 at a timing of 1 second after the reproduction timing of the PTS and the DTS, for which the contents server 51 does not define any initial delay time, and the images are displayed on the display 68 of the wireless rear monitor 52 in a completely synchronized manner to ensure lip synchronization.

Additionally, in the intra-car entertainment system 50, since the delay addition circuit 56 of the contents server 51 delays the PTS and the DTS by the initial delay time in advance and the delay correction circuit 66 that is arranged upstream relative to the video decoder 67 of the wireless rear monitor 52 compensates the transmission delay time of the video data, the video decoder 67 itself is not required to execute any special complex process. In other words, any discrepancies between the sounds and the images due to the wireless transmission of the video data can be corrected to ensure lip synchronization with a simple arrangement of adding a delay addition circuit 56 and a delay correction circuit 66 respectively to the contents server 51 and the wireless rear monitor 52.

With the above-described arrangement of the intra-car entertainment system 50, when the sounds are output from the front speaker 61 of the contents server 51 and the PS packets of the video data are transmitted wirelessly from the contents server 51 to the wireless rear monitor 52 for the purpose of displaying the images of the video data, the influence of the transmission delay can be corrected to synchronize the sounds and the images to reliably ensure lip synchronization.

Figure 11:
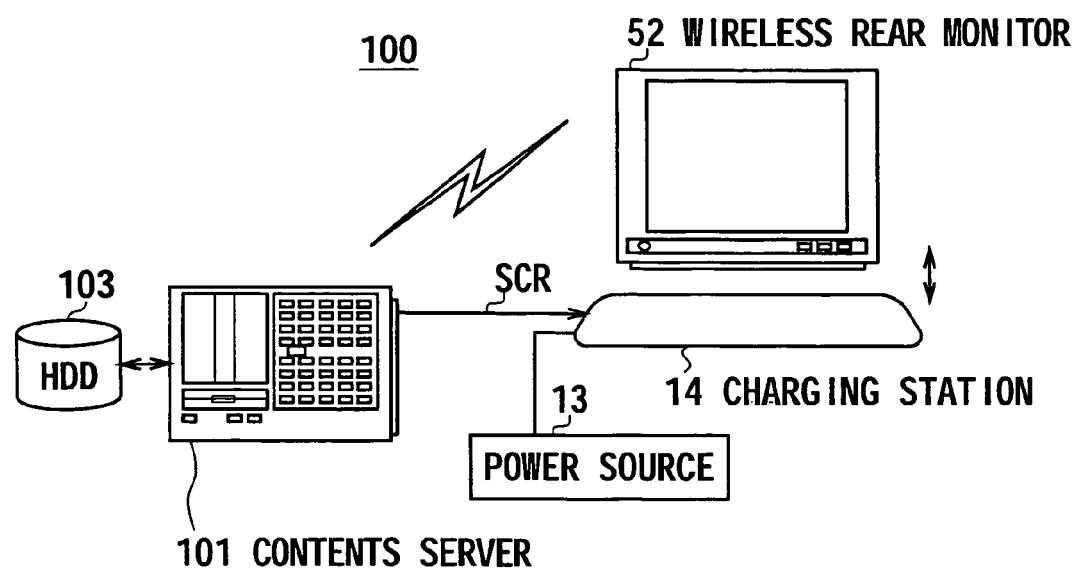
FIG. 11 is a schematic illustration of the second embodiment of intra-car entertainment system according to the invention, showing the overall configuration thereof.

(2) Second Embodiment (2-1) Overall Configuration of Intra-Car Entertainment System In FIG. 11, the components that are same as or similar to those of FIG. 5 are denoted respectively by the same reference symbols. Referring FIG. 11, the intra-car entertainment system of the first embodiment is generally denoted by reference symbol 100, which comprises a contents server 101 and a wireless rear monitor 52 that are connected with to each other wirelessly as in the intra-car entertainment system 50 of the first embodiment. Additionally, the intra-car entertainment system 100 of the second embodiment also comprises a hard disk drive 103 that is also connected to the contents server 101.

Thus, the intra-car entertainment system 100 is so designed that the audio data of a set of contents are decoded by the contents server 101 and output from a front speaker (not shown), while the video data of the set of contents that the wireless rear monitor 52 receives from the contents server 101 are decoded by and output from the wireless rear monitor 52. Therefore, the images of the set of contents are provided to the passenger(s) sitting on the rear seat by way of the wireless rear monitor 52, while the sounds of the set of contents are output from the front speaker at the side of the front seat so as to be listened to by the passenger(s) sitting on the rear seat.

In the intra-car entertainment system 100, the contents server 101 and a charging station 14 are connected to each other by wire so that the SCR of the contents server 101 is transmitted by wire to the wireless rear monitor 52 by way of the charging station 14.

With this arrangement, the wireless rear monitor 52 can synchronize the SCR transmitted from the contents server 101 by wire and the SCR that the wireless rear monitor 52 generates in a state where it is arranged on the charging station 14.

Additionally, in the intra-car entertainment system 100, the internal battery of the wireless rear monitor 52 can be charged with electricity as power is supplied from a power source 13 in a state where the wireless rear monitor 52 is arranged on the charging station 14 and the images of a set of contents can be displayed on the wireless rear monitor 52 in the state where the wireless rear monitor 52 is arranged on the charging station 14.

(2-2) Circuit Configuration of Intra-Car Entertainment System

Figure 12:
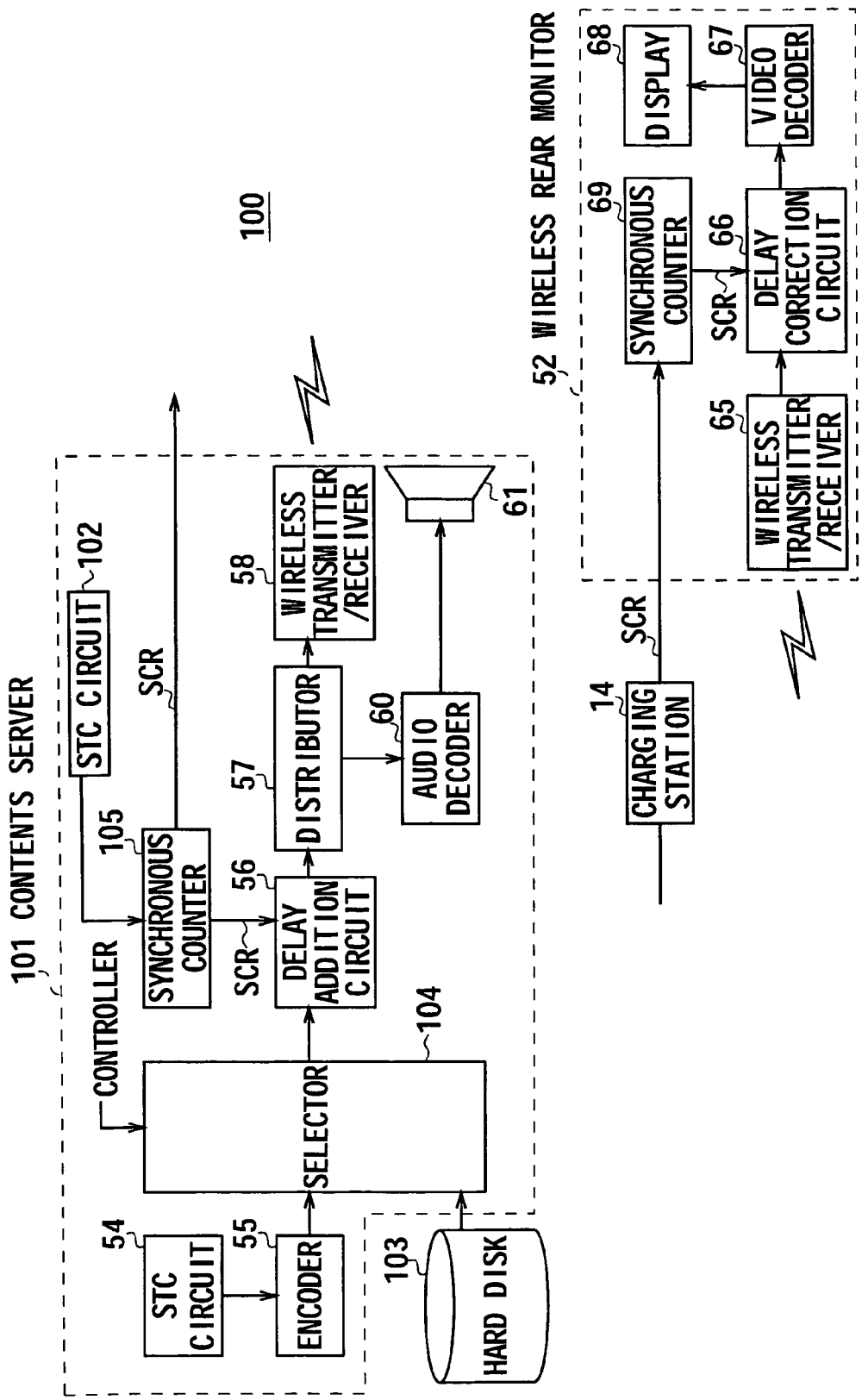
FIG. 12 is a schematic block diagram of the second embodiment of intra-car entertainment system according to the invention, illustrating the circuit configuration thereof.

In FIG. 12, the components same as or similar to those of FIG. 8 are denoted respectively by the same reference symbols. Referring to FIG. 12, unlike the contents server 51 of the first embodiment (FIG. 8) that transmits the SCR supplied from the STC circuit 54 to the wireless rear monitor 52 by way of the encoder 55 and the synchronous counter 62 by wire, the contents server 101 transmits the SCR supplied from an independently provided STC circuit 102 to the wireless rear monitor 52 by way of a synchronous counter 105.

Encoder 55 of the contents server 101 performs a compression coding operation on a set of contents according to the STC supplied from an STC circuit 54, using a predetermined compression coding system (e.g., the MPEG 2 system) and transmits the data obtained as a result of the compression coding and also the contents data it reads out from the hard disk drive 103 to a selector 104.

The selector 104 selects either the contents data from the encoder 55 or the contents data read out from the hard disk drive 103 according to a controller operation made by the user and transmits the selected contents data to a delay addition circuit 56.

The delay addition circuit 56 is so adapted that, when the contents data are packetized according to the data structure as shown in FIGS. 4 and 5, it adds a clock counter value of "90000" that corresponds to a second, which is the initial delay time predetermined by taking the transmission delay of the wireless transmission into consideration in advance, to the PTS and the DTS as observed at a 90 [khz] clock to delay the access unit output clock time and the decoding clock time from the proper timings by an initial delay time and transmits the PS packets obtained as a result of the addition to the distributor 57.

Meanwhile, since the SCR supplied from the STC circuit 54 when the contents data are compression-coded by the encoder 55 and the STC supplied from the STC circuit 102 by way of the synchronous counter 105 do not necessarily be synchronized, the delay addition circuit 56 is adapted to correct the difference and then add the clock counter value of "90000" that corresponds to the initial delay time to the PTS and the DTS when they are not synchronized.

More specifically, when the contents compression-coded by the encoder 55 are selected by the selector 104 and the SCR supplied from the STC circuit when the contents data are compression-coded by the encoder 55 and the STC supplied from the STC circuit 102 by way of the synchronous counter 105 are not synchronized, the delay addition circuit 56 corrects the difference. On the other hand, when the contents read out from the hard disk drive 103 are selected by the selector 104, the SCR supplied by way of the synchronous counter 105 is used without any correction. In this way, the delay addition circuit 56 can adapt itself both to the contents supplied from the encoder 55 and the contents supplied from the hard disk drive 103.

The distributor 57 transmits the PS packets of the video data out of the PS packets of the set of contents data supplied from the selector 104 to a wireless transmitter/receiver 58 and also the PS packets of the audio data out of the PS packets of the set of contents data to audio decoder 60. The wireless transmitter/receiver 58 wirelessly transmits the PS packets of the video data to the wireless rear monitor 52 according to a wireless LAN protocol such as the IEEE 802.11g.

The audio decoder 60 reproduces the PS packets of the audio data and outputs them as the sounds of the set of contents from the front speaker 61 according to the PTS obtained by adding the clock counter value of "90000" that corresponds to a second, or the initial delay time, and the SCR.

Thus, the contents server 101 outputs the sounds of the set of contents from the front speaker 61 at the time delayed by a second from the clock time specified by the proper PTS.

On the other hand, the wireless rear monitor 52 is adapted to take in the SCR that is sequentially transmitted from the contents server 101 by wire by way of the charging station 14 and lock it with the PLL in a state where it is arranged on the charging station 14 so that it transmits the SCR of the wireless rear monitor 52, which is completely synchronized with the SCR of the contents server 101, to the delay correction circuit 66.

The wireless rear monitor 52 also receives the PS packets of the video data transmitted from the contents server 101 wirelessly by means of a wireless transmitter/receiver 65 and transmits them to the delay correction circuit 66.

The delay correction circuit 66 computes the transmission delay time of the PS packets according to the SCR value that is completely synchronized with the SCR of the contents server 101 that is supplied with the synchronous counter 69 and the SCR value added to the PS packets transmitted wirelessly from the contents server 101 and executes a predetermined correction process (which will be described in greater detail hereinafter) that corresponds to the computed transmission delay time on the SCR added to the PS packets.

Then, the delay correction circuit 66 executes a decoding process by means of a video decoder 67 according to the corrected SCR that is obtained as a result of the correction process and displays the images of the set of contents on a display 68. In this way, it synchronizes the sounds output from the front speaker 61 of the contents server 101 and the images displayed on the display 68 to realize lip synchronization.

Since the principle of adjustment of lip synchronization of the second embodiment is same as that of the first embodiment, it will not be described here any further. Hence, only the lip synchronization adjusting method that is used when the contents from the encoder 55 are selected by the selector 104 will be specifically described below. Note that the lip synchronization adjusting method that is used when the contents from the hard disk drive 103 are selected by the selector 104 is same as the lip synchronization adjusting method of the first embodiment described above by referring to FIGS. 10A to 10C so that it will not be described here any further.

(2-3) Lip Synchronization Adjusting Method

Figure 13A:
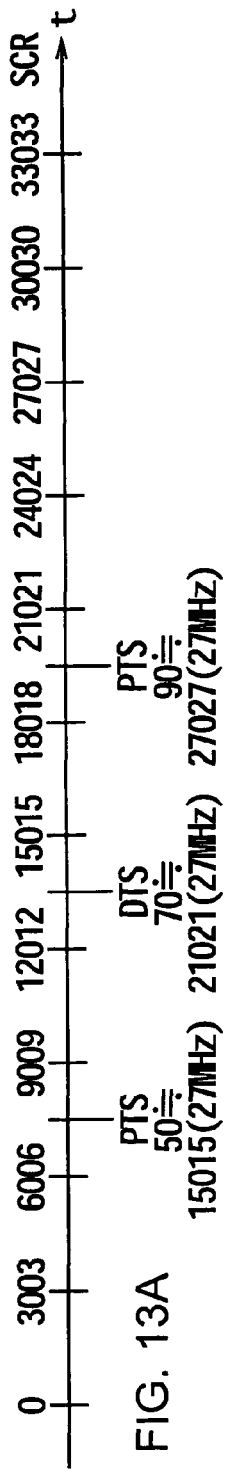
FIGS. 13A to 13C are schematic illustrations of the lip synchronization adjustment method of the second embodiment.
Figure 13B:
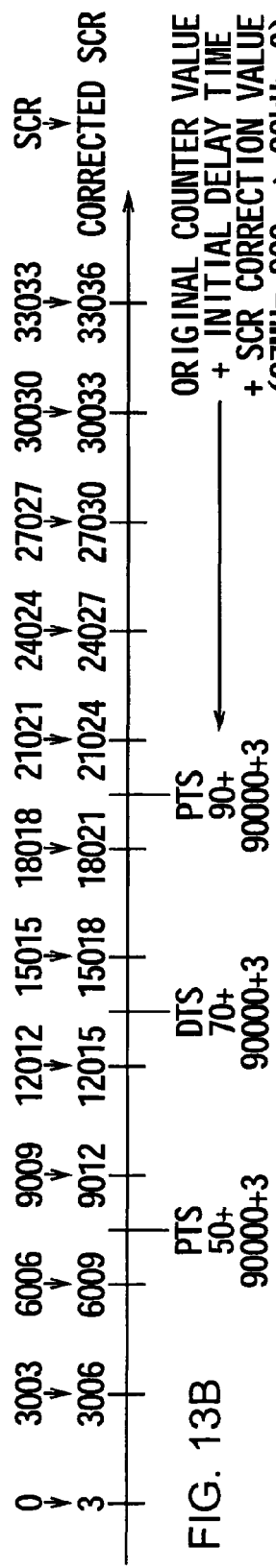

Referring to FIGS. 13A and 13B, if the SCR value that provides a reference when compression-coding the contents firstly by means of the encoder 55 and the SCR value that is supplied to the delay addition circuit 56 by means of the synchronous counter 105 show a difference of a clock counter value of "900" that corresponds to 27 [MHz], for instance, the contents server 101 has to correct the difference of the clock counter value of "900". For this purpose, the contents server 101 generates a corrected SCR by adding a clock counter value of "3" that is obtained by frequency-dividing the clock counter value of "900", which corresponds to 27 [MHz], by 300.

Subsequently, the contents server 101 adds a clock counter value of "90000", which corresponds to the initial delay time (1 second) that is determined by taking the transmission delay time (0.5 seconds or 0.7 seconds) into consideration, to the PTS and the DTS and, at the same time, redefines the PTS and the DTS by adding the value used to correct the SCR that is obtained by reducing the clock counter value of "900" that corresponds to 27 [MHz] to the clock counter value of "3" that corresponds to 90 [khz] so as to match the corrected SCR.

As a result, the contents server 101 outputs the sounds of the set of contents from the front speaker 61 at the reproduction timing that comes 1 second, which is equal to the initial delay time, after the reproduction timing of the PTS, for which no initial delay time is defined, for the PS packets of the audio data.

Figure 13C:
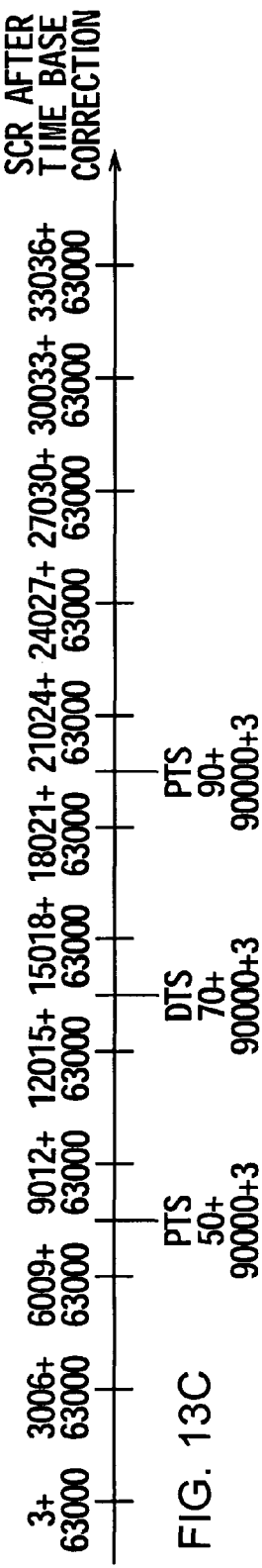

On the other hand, since the PS packets of the video data are transmitted from the contents server 101 to the wireless rear monitor 52 with a transmission delay of 0.7 seconds as shown in FIG. 13C, the images of the video data are displayed with a delay of 1.7 seconds if the wireless rear monitor 52 outputs the images of the video data according to the PTS and the DTS, for which the initial delay time (1 second) is defined, because the PS packets of the video data arrives from the contents server 101 with a transmission delay of 0.7 seconds.

To correct the delay, the wireless rear monitor 52 corrects the time base of the SCR by adding the clock counter value of "63000" that corresponds to the transmission delay time of 0.7 seconds to the corrected SCR value in order to compensate the time equal to the transmission delay that is observed when the PS packets of the video data wirelessly arrives behind time.

The wireless rear monitor 52 decodes and outputs the video data according to the SCR, the time base of which is corrected, and the PTS and the DTS, for which the initial delay time is defined.

As a result of the arrangement that the wireless rear monitor 52 compensates the transmission delay time (0.7 seconds), by which the PS packets of the video data are delayed by transmission, according to the SCR obtained by correcting the time base thereof, it is possible to display the images of the video data on the display 68 after waiting for the computed delay time (0.3 seconds) after the arrival of the PS packets of the video data to the wireless rear monitor 52 if it decodes the video data when the corrected SCR, the time base of which is corrected, becomes equal to the PTS and the DTS, for which the initial delay time is defined.

In other words, since the sum of the transmission delay time and the computed delay time is equal to the initial delay time, which is equal to 1 second, the wireless rear monitor 52 outputs the images 1 second after the ordinary output timing.

(2-4) Operation and Effects

With the above described arrangement, if the SCR that provides a reference for the operation of compression coding of the encoder 55 and the SCR supplied from the synchronous counter 105 to the delay addition circuit 56 show a difference, the contents server 101 of the intra-car entertainment system 100 corrects the difference by means of the delay addition circuit 56 and uses the corrected SCR thereafter.

As a result, if there are a slight difference between the SCR that is based on the STC obtained when the contents supplied from the encoder 55 are compression-coded and the SCR of the synchronous counter 105, the contents server 101 can eliminate the difference by using the corrected SCR to realize lip synchronization. Additionally, if the contents read out from the hard disk drive 103 are selected by the selector 104, the SCR supplied from the synchronous counter 105 is used to adjust the timing for lip synchronization. Thus, this embodiment ensures lip synchronization regardless of the type of the contents.

More specifically, when the contents supplied from the encoder 55 are packetized into PC packets, the delay addition circuit 56 of the contents server 101 adds a clock counter value of "90000", which corresponds to the initial delay time (e.g., 1 second) and is greater than the actual transmission delay time (0.7 seconds), taking the transmission delay due to the wireless transmission from the contents server 101 to the wireless rear monitor 52 into consideration, to the SCR and also adds the difference between the SCR that provides a reference for the operation of compression coding of the encoder 55 and the SCR supplied from the synchronous counter 105 to the delay addition circuit 56, or the clock counter value "3" that corresponds to 90 [khz] so as to delay the access unit output clock time and the decoding clock time by 1 second from the proper timing.

Then, the wireless rear monitor 52 adds the clock counter value of "63000" that corresponds to the transmission delay time (0.7 seconds) to the corrected SCR of the PC packets to correct the time base of the corrected SCR so as to advance the time base and compensate the transmission delay of the PS packets of the video data in order to compensate the delay equal to the transmission delay (0.7 seconds) of the PS packets of the video data that are transmitted from the contents server 101 wirelessly and arriving at the wireless rear monitor 52.

As a result, the wireless rear monitor 52 can decode the PS packets of the video data according to corrected SCR, the time base of which is corrected, and the PTS and the DTS delayed from the reproduction timing by the initial delay time and display the images of the PS packets on the display 68 so as to display the images after 1 second that corresponds to the initial delay time.

With the above-described arrangement, the intra-car entertainment system 100 can completely synchronize the sounds output from the front speaker 61 at the timing that comes 1 second after the reproduction timing of the PTS and the DTS, for which no initial delay time is defined by the contents server 101 and the images displayed on the display 68 of the wireless rear monitor 52 to reliably ensure lip synchronization.

With the above-described arrangement, the intra-car entertainment system 100 can synchronize the sounds obtained by decoding the audio packets of the set of contents supplied from the encoder 55 of the contents server 101 and output from the front speaker 61 and the images obtained by decoding the PS packets of the video data that show a transmission delay by means of the wireless rear monitor 52 and displayed on the display 68 to reliably ensure lip synchronization.

With the above-described arrangement, the intra-car entertainment system 100 can synchronize the sounds obtained by decoding the audio packets of the set of contents supplied from the hard disk drive 103 of the contents server 101 and output from the front speaker 61 and the images obtained by decoding the PS packets of the video data that show a transmission delay by means of the wireless rear monitor 52 and displayed on the display 68 to reliably ensure lip synchronization.

(3) Other Embodiments

While the synchronous counter 62 or 105 of the contents servers 51 or 101, whichever appropriate, is connected to the charging station 14 by wire in each of the above described first and second embodiments so that the SCR is transmitted from the contents server 51 and 101, whichever appropriate, to the wireless rear monitor 52 by way of the charging station 14 as reference clock time information for the purpose of synchronization of sounds and images, the present invention is by no means limited thereto and it may alternatively be so arranged that the contents server 51 or 101 and the wireless rear monitor 52 synchronizes the respective SCRs according to the absolute clock time received from a GPS (global positioning system) satellite or by utilizing a microwave clock.

While an access unit is wirelessly transmitted from the contents server 51 or 101 to the wireless rear monitor 52 as a PS packet in each of the above described first and second embodiments, the present invention is by no means limited thereto. In other words, an access unit may not necessarily be a PS packet for the purpose of the present invention.

While the video data of a set of contents are transmitted wirelessly from the contents server 51 or 101 to the wireless rear monitor 52 in each of the above-described first and second embodiments and the sounds obtained by reproducing the audio data of the set of contents by means of the contents server 51 or 101, whichever appropriate, and output from the front speaker 61 and the images obtained by decoding the video data by means of the wireless rear monitor 52 and displayed on the display 68 are adjusted for lip synchronization, the present invention is by no means limited thereto. It may alternatively be so arranged that the audio data are transmitted wirelessly from the contents server 51 or 101 to the wireless rear speaker arranged at the side of the rear seat and the images obtained by decoding the video data by means of the contents server 51 or 101, whichever appropriate, and output from a front display and the sounds output from a wireless rear speaker are adjusted for lip synchronization.

Furthermore, while the present invention is applied to the intra-car entertainment systems 50 and 100 of the first and second embodiments in the above description, the present invention is by no means limited thereto and the present invention may also be applied to a home AV (audio visual) system that wirelessly transmits video data and outputs sounds and images separately.

Finally, while the intra-car entertainment systems 50, 100 that are audio/video synchronizing system according to the invention are formed by using the contents servers 51, 101 and wireless rear monitors 52 that are monitor apparatus and each of the contents servers is formed by the synchronous counter 62 or 105 that operates as reference clock time wired transmission means, the delay addition circuit 56, the distributor 57, the wireless transmitter/receiver 58, the delay addition circuit 56, the distributor 57, the wireless transmitter/receiver 58 operating as image transmission means, the audio decoder 60 and the speaker 61, the audio decoder 60 and the speaker 61 operating as sound output means and the monitor apparatus is formed by the wireless transmitter/receiver 65 that operates as image receiving means, the synchronous counter 69 that operates as reference clock time synchronizing means, the delay correction circuit 66 that operates both as transmission delay computing means and delay correcting means, the video decoder 67 and the display 68, the video decoder 67 and the display 68 operating as image output means, the present invention is by no means limited thereto and the contents server and the monitor apparatus may be formed respectively by using other circuit configurations.

An audio/video synchronizing system and an audio/video synchronizing apparatus according to the invention can find applications where either sounds or images are transmitted wirelessly and the sounds and the images are synchronized for lip synchronization when output.

It should be understood by those skilled in the art that various modifications, combinations, sub-combinations and alterations may occur depending on design requirements and other factors insofar as they are within the scope of the appended claims or the equivalents thereof.

The invention claimed is:

1. An audio/video synchronizing system for synchronizing sounds of a set of contents output from a speaker connected to a contents server and images of the set of contents output from a monitor, the system comprising:
   a contents server; and
   a monitor;
   the contents server including:
       reference clock time wired transmission means for transmitting reference clock time of the contents server to the monitor by wire;
       image transmission means for setting up a time stamp with an attached clock counter value corresponding to an initial delay time for delaying the output timing of the audio packets and the video packets of the set of contents, wherein the initial delay time is greater than a predetermined largest transmission delay of wireless transmission of the video packets from the contents server to the monitor, and wirelessly transmitting the video packets to the monitor with the time stamp showing the attached initial delay; and
       sound outputting means for reproducing the sound packets according to the reference clock time of the contents server and the time stamp and outputting the sounds of the set of contents; and
   the monitor including:
       image receiving means for receiving the wirelessly transmitted video packets;
       reference clock time synchronizing means for receiving the reference clock time transmitted from the contents server by wire and synchronizing the reference clock time of the contents server and a reference clock time of the monitor;
       transmission delay time computing means for computing the transmission delay time due to the wireless transmission according to the reference clock time of the monitor and the reference clock time information of the contents server attached to the video packets;
       delay correcting means for compensating the transmission delay time by correcting the reference clock time information attached to the video packets according to the transmission delay time; and
       image outputting means for synchronizing the output timing of the images and that of the sounds by decoding the video packets according to the corrected reference clock time information and the time stamp with the added clock counter value corresponding to the initial delay time, such that output of the images is after elapse of a time, interval starting from a time when the video packets are received, the time interval being equal to a difference between the initial delay time and the transmission delay time.

2. The system according to claim 1, wherein
   the contents server further includes reference clock time generating means for generating a reference clock time that is independent from predetermined coding means for the sounds and the images; and
   the image transmission means defines a time stamp obtained by adding a clock counter value that corresponds to the initial delay time, using the corrected reference clock time obtained by correcting the difference between the reference clock time used for coding the sounds and the images by the coding means and the reference clock time generated by the reference clock time generating means.

3. A monitor adapted to output sounds of a set of contents from a speaker connected to a contents server providing the set of contents but receive images of the set of contents transmitted from the contents server wirelessly and output them on display means, the monitor comprising:
   reference clock time synchronizing means for receiving the reference clock time of the contents server transmitted from the contents server by wire and synchronizing the reference clock time of the contents server and a reference clock time of the monitor;
   image receiving means for receiving the video packets wirelessly transmitted from the contents server with a time stamp attached thereto and obtained by adding the clock counter value corresponding to an initial delay time in advance in order to delay the output timing of the sounds and the images, wherein the initial delay time is greater than a predetermined maximum transmission delay due to wireless transmission of the video packets from the contents server to the monitor;
   transmission delay time computing means for computing the transmission delay time due to the wireless transmission according to the reference clock time of the monitor and the reference clock time information of the contents server attached to the video packets;
   delay correcting means for compensating the transmission delay time by correcting the reference clock time information attached to the video packets according to the transmission delay time; and
   image outputting means for synchronizing the output timing of the images and that of the sounds by outputting the images according to the corrected reference clock time information and the time stamp with the added clock counter value corresponding to the initial delay time, such that the outputting of the images is after elapse of a time interval starting from a time when the video packets are received, the time interval being equal to a difference between the initial delay time and the transmission delay time.

4. An audio/video synchronizing method of synchronizing output timing of sounds and output timing of images of a set of contents, the sounds being output from a speaker connected to a contents server, the images being received and displayed by display means, the method comprising:

receiving a reference clock time of the contents server transmitted from the contents server by wire and synchronizing the reference clock time of the contents server and a reference clock time of the monitor;

receiving video packets transmitted wirelessly from the contents server with a time stamp attached thereto and obtained by adding a clock counter value corresponding to an initial delay time in advance in order to delay the output timing of the sounds and the images, wherein the initial delay time is greater than a predetermined maximum transmission delay due to wireless transmission of the video packets from the contents server to the monitor;

computing a transmission delay time due to the wireless transmission according to the reference clock time of the monitor and the reference clock time information of the contents server attached to the video packets;

compensating the transmission delay time by correcting the reference clock time information attached to the video packets according to the transmission delay time; and synchronizing the output timing of the images and the output timing of the sounds by outputting the images according to the corrected reference clock time information and the time stamp with the added clock counter value corresponding to the initial delay time, such that the outputting of the images is after elapse of a time interval starting from a time when the video packets are received, the time interval being equal to a difference between the initial delay time and the transmission delay time.

5. An audio/video synchronizing system for synchronizing sounds of a set of contents output from a speaker connected to a contents server and images of the set of contents output from a monitor, the system comprising:

a contents server; and a monitor;

the contents server including:
- a reference clock time wired transmission unit that transmits the reference clock time of the contents server to the monitor by wire;
- an image transmission unit that sets up a time stamp with an attached clock counter value corresponding to an initial delay time for delaying the output timing of the audio packets and the video packets of the set of contents, wherein the initial delay time is greater than a predetermined largest transmission delay of wireless transmission of the video packets from the contents server to the monitor, and wirelessly transmits the video packets to the monitor with the time stamp showing the attached initial delay; and
- a sound outputting unit that reproduces the sound packets according to the reference clock time of the contents server and the time stamp and outputs the sounds of the set of contents; and the monitor including:
- an image receiving unit that receives the wirelessly transmitted video packets;
- a reference clock time synchronizing unit that receives the reference clock time transmitted from the contents server by wire and synchronizes the reference clock time of the contents server and the reference clock time of the monitor;
- a transmission delay time computing unit that computes the transmission delay time due to the wireless transmission according to the reference clock time of the monitor and the reference clock time information of the contents server attached to the video packets;
- a delay correcting unit that compensates the transmission delay time by correcting the reference clock time information attached to the video packets according to the transmission delay time; and
- an image outputting unit that synchronizes the output timing of the images and that of the sounds by decoding the video packets according to the corrected reference clock time information and the time stamp with the added clock counter value corresponding to the initial delay time, such that output of the images is after a elapse of time interval starting from a time when the video packets are received, the time interval being equal to a difference between the initial delay time and the transmission delay time.

6. A monitor adapted to output sounds of a set of contents from a speaker connected to a contents server providing the set of contents but receive images of the set of contents transmitted from the contents server wirelessly and output them on a display unit, the monitor comprising:

a reference clock time synchronizing unit that receives a reference clock time of the contents server transmitted from the contents server by wire and synchronizes the reference clock time of the contents server and a reference clock time of the monitor;

an image receiving unit that receives the video packets wirelessly transmitted from the contents server with a time stamp attached thereto and obtained by adding the clock counter value corresponding to the initial delay time in advance in order to delay the output timing of the sounds and the images, wherein the initial delay time is greater than a predetermined maximum transmission delay due to wireless transmission of the video packets from the contents server to the monitor;

a transmission delay time computing unit that computes the transmission delay time due to the wireless transmission according to the reference clock time of the monitor and the reference clock time information of the contents server attached to the video packets;

a delay correcting unit that compensates the transmission delay time by correcting the reference clock time information attached to the video packets according to the transmission delay time; and an image outputting unit that synchronizes the output timing of the images and that of the sounds by outputting the images according to the corrected reference clock time information and the time stamp with the added clock counter value corresponding to the initial delay time, such that the outputting of the images is after elapse of a time interval starting from a rime when the video packets are received, the time interval being equal to a difference between the initial delay rime and the transmission delay time.

* * * * *